Oct. 28, 1952     B. HAYDEN     2,615,277
DEMOUNTABLE WEED GUARD FOR FISHHOOKS
Filed Dec. 16, 1950
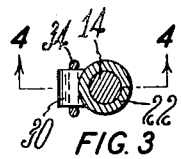
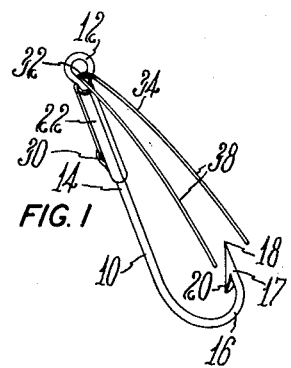
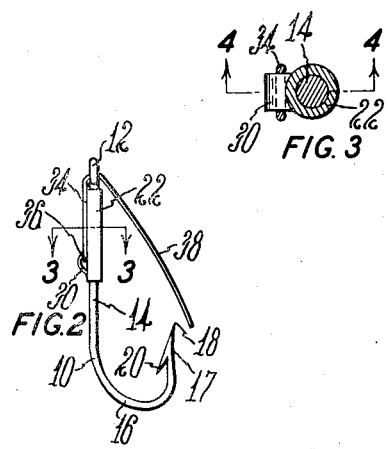
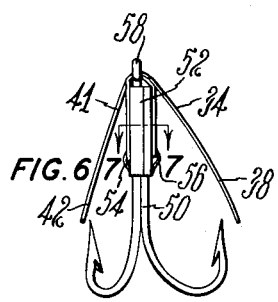
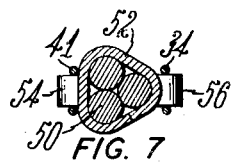
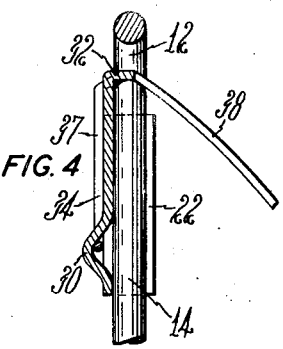
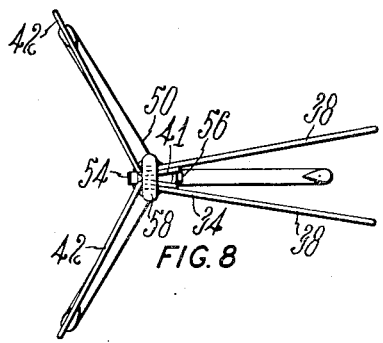
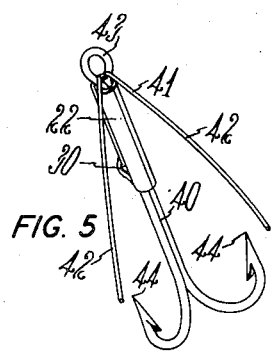
*INVENTOR*
*BOYD HAYDEN*
by Wright, Brown, Quinby & Way
*ATTYS*

Patented Oct. 28, 1952

2,615,277

UNITED STATES PATENT OFFICE 2,615,277

DEMOUNTABLE WEED GUARD FOR FISHHOOKS

Boyd Hayden, Newton, Mass.

Application December 16, 1950, Serial No. 201,098

5 Claims. (Cl. 43—43.2)

This invention relates to a weed guard and means by which the guard can be mounted on a fishhook or removed therefrom. It is an object of the invention to provide a guard which is simple in structure but effective in service, and to provide means by which the guard is securely held in place on a fishhook from which it can readily be removed when desired.

According to the invention, the supporting member is a sleeve which is crimped on the shank of a fishhook so that it embraces the portion of the shank adjacent to the eye of the hook. The sleeve may be made of any suitable material such as metal or a stiff plastic. The sleeve is provided with a small loop which projects outward therefrom, preferably at a point near the end of the sleeve remote from the eye of the fishhook. The guard member itself is a piece of fine resilient wire which is bent double at its mid point and is threaded through the loop so that the mid point is in the loop. The doubled wire extends up along the sleeve to and through the eye. From the eye the end portions of the wire project approximately in the direction of the tip of the hook so that the extremities of the wire are normally near to but on opposite sides of the hook. The wire is preferably stiff enough to deflect weeds encountered when the hook is drawn through the water, but is also limber enough to yield easily when a fish strikes at the hook.

For a more complete understanding of the invention, reference may be had to the following description thereof and to the drawings, of which—

Figure 1 is a perspective view of a single fishhook on which is mounted an embodiment of the invention;

Figure 2 is a side elevation of the same;

Figure 3 is a section on the line 3—3 of Figure 2;

Figure 4 is a fragmentary section on the line 4—4 of Figure 3;

Figure 5 is a perspective view of a double fishhook having an embodiment of the invention mounted thereon;

Figure 6 is an elevational view of a triple fishhook including an embodiment of the invention;

Figure 7 is a section on the line 7—7 of Figure 6; and

Figure 8 is a plan view, on a larger scale, of the triple hook shown in Figure 6.

The invention may be embodied in a weed guard for a single fishhook 10 such as is illustrated in Figures 1–4. As shown on the drawing, this hook may be of conventional form with an eye 12 at the upper end of a shank 14, the lower portion of which curves into a hook 16 terminating in a prong 17 which is pointed as at 18 and which customarily has a barb 20. According to the invention a supporting sleeve 22 is wrapped around the portion of the shank 14 which is adjacent to the eye 12. Preferably the sleeve 22 is pressed strongly against the shank 14 in the process of being applied thereto so that it pinches and grips the shank. If desired, however, the sleeve may be additionally secured by any suitable means such as sweating, brazing, or welding. Before the sleeve is applied to the shank, it is supplied with a loop 30, preferably near its lower end. The loop may be a small ring secured to the sleeve, or, as shown, the loop may be struck up from the material of the sleeve blank by cutting parallel slits and pushing up out of the plane of the blank the strip defined between these slits. If desired, the sleeve which is pinched on the shank 14 may be held against slipping down the shank in case it becomes slightly loosened by the provision of a small tongue 32 which, as indicated in Figure 4, is bent so as to extend into the eye 12.

The guard itself consists of a piece of spring wire 34 which is bent double at its mid point, the wire being inserted through the eye 30 until the bend 36 is within the loop 30. The portions 37 of the wire 34 which are adjacent to the bend 36 are arranged to lie against the sleeve 22 and to extend from the loop 30 up to and through the eye 12. The free end portions 38 of the wire 34 project from the eye 12 in the general direction of the point 18 and terminate near such point, the other end portion being on the other side as indicated in Figure 1. These free end portions 38 thus deflect weeds and other obstacles in the water through which the hook is pulled but will yield to expose the prong of the hook when struck by a fish. The guard 34 is easily detachable by pushing the end portions 38 back through the eye 12 whereupon the guard can readily be removed from the loop 30.

The invention may also be applied to a double hook 40 such as is shown in Figure 5. A sleeve 22 is pinched on to the shank of the hook 40, the sleeve having a loop 30 through which is threaded a piece of spring wire 41, the shape of the wire being substantially as hereinbefore described. When the guard 41 is employed on a double hook, the free end portions 42 extend from the eye 43 to points adjacent to but slightly beyond the respective points 44 of the double hook 40, each end portion 42 of the guard being substantially in the plane defined by one of the hooks and its shank.

The invention may also be embodied in a triple hook 50 such as is illustrated in Figures 6, 7 and 8. A sleeve 52 is made with two loops 54 and 56 and is wrapped around the shank of the triple hook 50 so as to grip the portion of the shank adjacent to the eye 58. The loop 54 is opposite to one of the three hooks of the triple hook 50. A weed guard 34 is threaded through the loop 54 so as to protect the hook which is opposite this loop. This guard is constructed and arranged in the same manner as the guard illustrated in Figure 1. A second guard 41, similar to that shown in Figure 5, is threaded through the loop 56 and is arranged to protect the other two hooks of the triple hook in the manner hereinbefore described.

Certain embodiments of the invention having been described, it is evident that modifications and changes may be made therein without departing from the scope of the invention defined in the following claims.

I claim:

1. In combination with a fishhook having an eye, a shank and a prong, a sleeve embracing said shank near the eye said sleeve having, a loop projecting outward therefrom, and a resilient wire guard member extending through the loop and eye, said guard member having a free end portion near the prong of the hook.

2. In combination with a fishhook having an eye and a shank, a sleeve embracing said shank near the eye, said sleeve having a narrow tongue at its upper end bent to extend into said eye and a loop struck up from the body of the sleeve near the lower end thereof, and a wire guard member extending through said loop and eye.

3. A fish hook having an eye, a shank and a prong, a tubular sleeve embracing a portion of said shank adjacent to the eye said sleeve having, a loop struck up therefrom to project outward therefrom, and a guard member of resilient wire doubled upon itself, said wire extending through said loop at its mid point, the two parts of the wire adjacent to the mid point extending along said sleeve and through said eye, the free end portions of the wire extending from said eye toward the prong of the hook and diverging so that the extremities of the wire are on opposite sides of said prong and spaced therefrom.

4. In combination with a double fishhook having an eye, a double shank and two prongs, a sleeve embracing the shank adjacent to the eye said sleeve having, a small loop projecting outward therefrom near the end thereof remote from the eye, and a resilient wire guard member extending at its mid point through said loop, the portions of said wire adjacent to said mid point extending along said sleeve and through said eye, the free end portions of said wire extending from said eye to the vicinity of said prongs respectively.

5. In combination with a triple fishhook having an eye, a triple shank and three prongs, a sleeve embracing said shank adjacent to said eye said sleeve having, two small loops projecting outward therefrom on opposite sides of said shank, a resilient wire guard member extending at its mid point through one of said loops, the portions of said wire adjacent to the mid point extending along said sleeve and through said eye, the ends of said wire being respectively adjacent to the tips of two of said prongs, and a second guard member of resilient wire extending through the other said loop and through said eye to the vicinity of the third prong.

BOYD HAYDEN.

REFERENCES CITED

The following references are of record in the file of this patent:

UNITED STATES PATENTS

| Number | Name | Date |
|---|---|---|
| 440,721 | Provoost | Nov. 18, 1890 |
| 719,704 | Trakel | Feb. 3, 1903 |
| 1,766,279 | Brown | June 24, 1930 |
| 2,160,347 | Walsh | May 30, 1939 |
| 2,506,883 | Mattieson | May 9, 1950 |